No. 668,877. Patented Feb. 26, 1901.
F. HOLDSHOE.
LAWN MOWER.
(Application filed Dec. 28, 1899.)
(No Model.) 2 Sheets—Sheet 1.

Fig. I.

Witnesses
Sidney F. Hollingsworth
Chester A. Baker

Inventor
Frank Holdshoe
by W. H. Kennan
Attorney

THE NORRIS PETERS CO., PHOTO-LITHO., WASHINGTON, D. C.

No. 668,877. Patented Feb. 26, 1901.
F. HOLDSHOE.
LAWN MOWER.
(Application filed Dec. 28, 1899.)
(No Model.) 2 Sheets—Sheet 2.

UNITED STATES PATENT OFFICE.

FRANK HOLDSHOE, OF TIDIOUTE, PENNSYLVANIA.

LAWN-MOWER.

SPECIFICATION forming part of Letters Patent No. 668,877, dated February 26, 1901.

Application filed December 28, 1899. Serial No. 741,840. (No model.)

*To all whom it may concern:*

Be it known that I, FRANK HOLDSHOE, a citizen of the United States, residing at Tidioute, in the county of Warren and State of Pennsylvania, have invented certain new and useful Improvements in Lawn-Mowers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to lawn-mowers; and it has for its object to construct such a mower which will be formed of the minimum number of parts consistent with efficiency, thus not only reducing the cost of manufacture, but rendering the machine light in weight, not liable to get out of order, and easily repaired by unskilled labor if any of the parts become broken by accident, also in which the parts will possess strength and directness of action, and also in which the space to the rear of the cutter-bar and between the wheels as well as between the sides and top of the connecting-frame will be open and unobstructed by gears in framework, thus affording a free open space for the cut grass.

To the accomplishment of the foregoing and such other objects as may hereinafter appear the invention consists in the construction and in the combination of parts hereinafter particularly described and then sought to be specifically defined by the claims, reference being had to the accompanying drawings, forming a part hereof, and in which—

Figure 1:
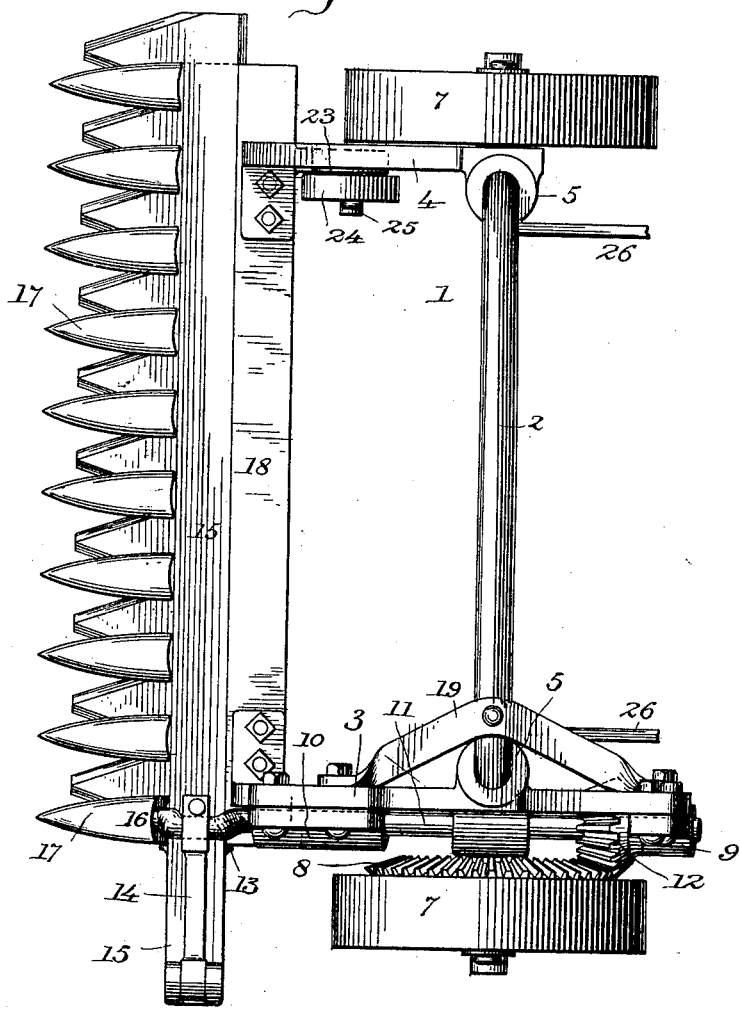
Figure 2:
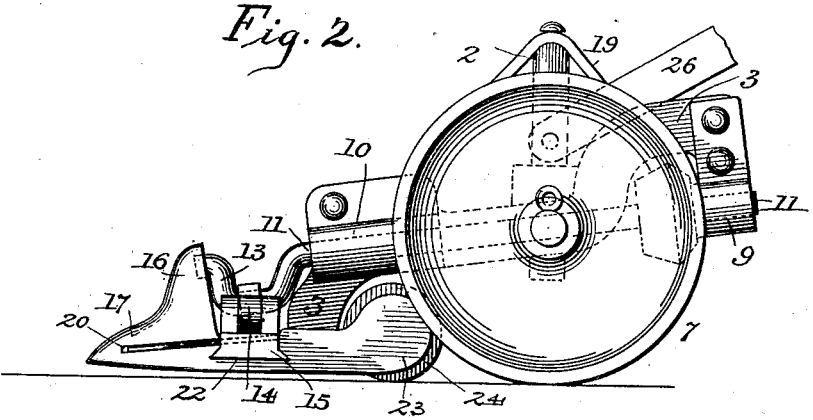
Figure 3:
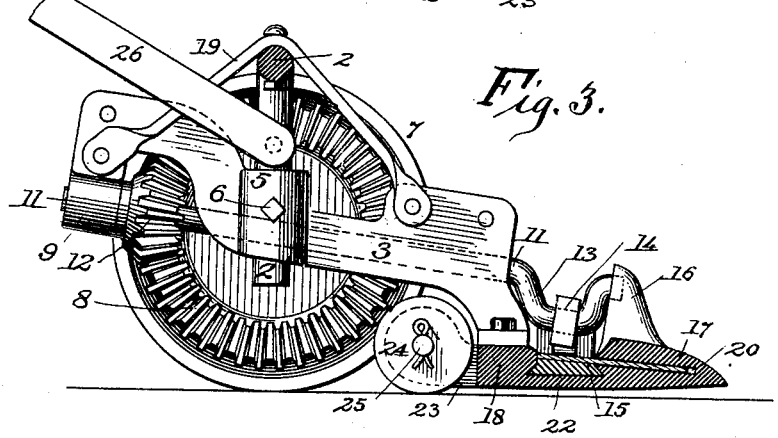
Figure 4:
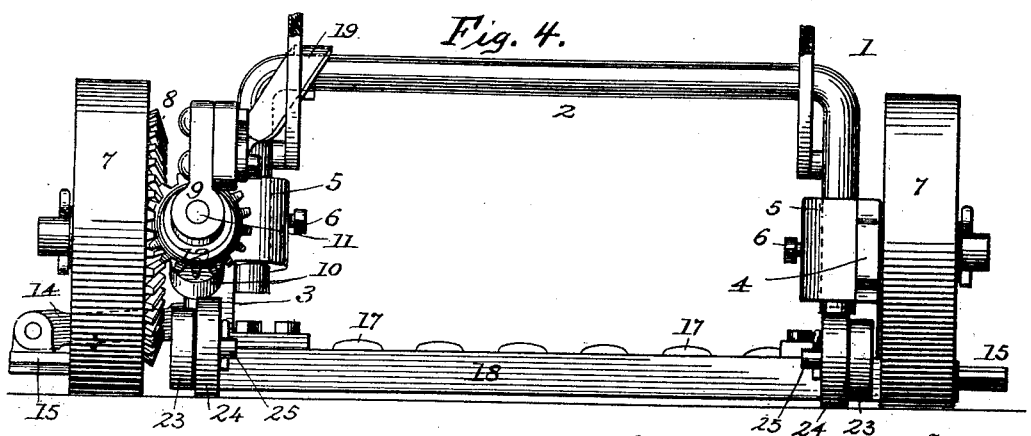

Figure 1 is a plan view of the mower. Fig. 2 is a side view thereof. Fig. 3 is a vertical section through the same, and Fig. 4 is a rear end view of the same.

In the drawings the numeral 1 designates the frame, consisting of the arched cross member 2 and side members 3 and 4, which arched member may fit in boxes 5, forming a part of the side members, and held therein by set-screws 6, although the cross member and side members may be cast in one piece, and 7 designates the drive-wheels, journaled on axles extending from the side members, one of the drive-wheels being provided with the bevel-gear 8. The side member 3 has boxes 9 and 10, either cast therewith or bolted thereto, so as to receive the sickle-bar-driving shaft 11, which is provided with a bevel-pinion 12 to mesh with the driving-gear 8 and is formed with a crank 13, to which is connected one end of the pitman 14, which at the other end is connected to the sickle-bar 15, the forward end of the driving-shaft having its bearing in the bracket 16, cast as a part of one of the fingers 17 of the finger-bar 18.

The cross member 2 and the side member 3 are braced and strengthened by a brace 19, which is illustrated as bolted to the side member and the cross member of the frame where the greatest strain comes on the frame by the power-transmitting mechanism; but instead of being bolted, as specified, said brace may be cast with the cross member and the side member when the parts of the frame are cast together. By having the driving-shaft 11 arranged as specified and the bevel-pinion 12 secured thereto to the rear of the cross member of the frame the pinion is located where it is easily accessible and at the same time where it will not be clogged by the cut grass.

To the forward ends of the side members 3 and 4 there is bolted or otherwise secured the finger-bar 18. The finger-bar has the fingers 17 cast integral with it, the fingers being formed with the slots 20 for the teeth or blades of the cutter-bar 15 and also formed with the dovetailed groove or recess 22 for the cutter-bar to reciprocate in. From the rear of the finger-bar extend the ears or arms 23, which are cast with the finger-bar and have the rollers 24 journaled therein, so that the finger-bar will be supported at the rear by said rollers.

The handle 26 is hinged to the frame, as illustrated.

It will be observed that the features of construction and arrangement of parts as illustrated and described form a lawn-mower of very simple construction, in which the parts are comparatively few in number and arranged so as to secure the greatest strength with the least liability to get out of order and in which the cut grass can pass beneath the frame without meeting with any obstruction and without liability of lodging in and clogging the gears or any part of the machine.

Having described my invention and set forth its merits, what I claim is—

1. The combination of the frame composed of the side members connected together by the arched cross member to leave a clear unobstructed space between the wheels and to the rear of the cutter-bar, the driving-wheels journaled to the outside of the side members of the frame and one of which has a gear-wheel secured to its side, the cutter-bar, the cutter-bar-driving shaft extending parallel with and outside of one side of the frame and journaled in boxes carried by the frame to the front and to the rear of the journal of the drive-wheel carrying the gear-wheel, the pinion secured to the cutter-bar-driving shaft and meshing with the gear-wheel of the drive-wheel to the rear of the axle of said wheel, and a pitman connecting the cutter-bar and its driving-shaft, substantially as described.

2. The combination of the frame composed of the side members connected together by the arched cross member to leave a clear unobstructed space between the wheels and to the rear of the cutter-bar, two driving-wheels journaled to the outside of the side members of the frame and one of which has a gear-wheel secured to its side, the finger-bar, the cutter-bar, the cutter-bar-driving shaft extending parallel with and outside of one side of the frame and journaled in boxes carried by the frame to the front and to the rear of the journal of the drive-wheel carrying the gear-wheel, said driving-shaft being formed with a crank near its front and having that end journaled in a bracket formed as a part of one of the fingers of the finger-bar, a pitman connected at one end to said crank and at the other end to the cutter-bar, and the pinion carried by the driving-shaft and meshing with the gear-wheel on the driving-wheel at a point to the rear of the journal of said wheel, substantially as described.

3. The combination of the frame composed of the side members connected together by the arched cross member to leave a clear unobstructed space between the wheels and the rear of the cutter-bar, the finger-bar having the fingers formed integral therewith, and having a recess for the cutter-bar and the ears or arms extending to the rear thereof, the rollers journaled in said ears, the driving-wheels journaled to the outside of the side members of the frame and one of which has the gear-wheel secured to its side, the cutter-bar-driving shaft fitting in journal-boxes located to the front and to the rear of the journal of the drive-wheel, said shaft having a crank formed at one end with the end of the shaft journaled in one of the fingers of the finger-bar and provided with a pinion meshing with the gear-wheel secured to the side of the driving-wheel to the rear of the journal of the drive-wheel, and the pitman connecting the cutter-bar and its driving-shaft, substantially as described.

In testimony whereof I affix my signature in presence of two witnesses.

FRANK HOLDSHOE.

Witnesses:
N. W. SHUGERT,
G. F. BOWMAN.